United States Patent [19]

Crossley

[11] Patent Number: 4,780,821

[45] Date of Patent: Oct. 25, 1988

[54] METHOD FOR MULTIPLE PROGRAMS MANAGEMENT WITHIN A NETWORK HAVING A SERVER COMPUTER AND A PLURALITY OF REMOTE COMPUTERS

[75] Inventor: James F. Crossley, Fulton County, Ga.

[73] Assignee: International Business Machines Corp., Armonk, N.Y.

[21] Appl. No.: 890,389

[22] Filed: Jul. 29, 1986

[51] Int. Cl.⁴ .................. G06F 13/42; G06F 15/56
[52] U.S. Cl. ................................ 364/200; 340/825.31
[58] Field of Search ... 364/200 MS File, 900 MS File; 340/825.3, 825.31

[56] References Cited

U.S. PATENT DOCUMENTS

| | | | |
|---|---|---|---|
| 4,430,728 | 2/1984 | Beitel et al. | 340/825.31 X |
| 4,503,499 | 3/1985 | Mason et al. | 364/200 |
| 4,564,903 | 1/1986 | Guyette et al. | 364/200 |
| 4,586,134 | 4/1986 | Norstedt | 364/200 |
| 4,604,694 | 8/1986 | Hough | 364/200 |
| 4,633,245 | 12/1986 | Blount et al. | 340/825.03 |
| 4,633,430 | 12/1986 | Cooper | 364/900 |
| 4,649,533 | 3/1987 | Chorley et al. | 370/58 |
| 4,661,991 | 4/1987 | Logemann | 340/825.31 X |
| 4,677,434 | 6/1987 | Fascenda | 340/825.31 X |

OTHER PUBLICATIONS

Fague et al., "Locating and Accessing Remote Files", IBM TDB, vol. 26, No. 5, Oct. 1983, pp. 2451-2454.

Primary Examiner—Raulfe B. Zache
Assistant Examiner—Thomas C. Lee
Attorney, Agent, or Firm—C. Lamont Whitham; Michael E. Whitham

[57] ABSTRACT

The procedure which allows users of a computer system comprising a plurality of computers connected in a local area network to share both file resources and application programs on the local area network without modification to existing programs which were designed to run in a non-network environment is disclosed. The local area network comprises a server computer and at least one remote computer. Starting the network comprises an initial program load of the operating system for each of the computers, loading the local area network control program, and then loading a hypervisor or "node enabler" program. At each of the remote computers, a request to load a program or access a data file is converted by the "node enabler" to a file sharing and record locking protocol message with is transmitted to the server computer. The server computer stores a program matrix with entries indicating which programs can be run on the network without conflicts with other systems including the server computer. The server computer also maintains a list of currently running programs and accessed data files. By comparing the remote computer request with the program matrix and the list of currently running programs and accessed data files, a decision to grant a remote computer's request is made. In addition, by recording a unique identification number for each remote computer signed on to the network at the server computer, control of access to licensed programs is maintained.

6 Claims, 10 Drawing Sheets

METHOD FOR MULTIPLE PROGRAMS MANAGEMENT WITHIN A NETWORK HAVING A SERVER COMPUTER AND A PLURALITY OF REMOTE COMPUTERS

DESCRIPTION

BACKGROUND OF THE INVENTION

1. Field of the Invention

The present invention generally relates to the management of a multi-user/multi-tasking computer environment and, more particularly, to a procedure which allows users of a computer system comprising a plurality of computers connected in a local area network to share both file resources and application programs on the local area network without modification of existing application programs which were designed to operate in a non-network environment.

2. Description of the Prior Art

The networking of individual computers to allow an application program and file resources to be accessed by users of the computers has become of paramount importance in the data processing industry. In particular, business entities, from large corporations to relatively small companies, have demanded a way of allowing users of personal computers installed in their offices to share both application programs and file resources on a network. The hardware capability of accomplishing this has been provided in what is known as a local area network (LAN) of which there are several architectures. As but one example, the IBM Corporation has made commercially available the PC Network which comprises an adapter card for insertion into each personal computer connected in a network as well as other peripheral interconnection apparatus.

The demand of the customers of application programs requires the installation of multiple identical software configurations in a customer-managed environment; e.g., secretarial, business professional, and engineering or scientific systems. In many instances, this has resulted in a complete turnabout in the techniques which the personal computer software industry has used for a number of years; that is, application programs packaged in individual boxes and a license to use that program on a single computer or on only one computer at a time. The vast majority of commercially available application programs (as well as operating systems) are marketed today in this manner. With the advent of the demand for networking, a need has arisen to allow such existing commercially available programs to operate on a local area network. This dilemma has previously had but one solution and that was the redesign of the application programs to operate on a network. This solution is not only expensive, it has a ripple effect. Once redesigned to run on a network, the application programs must then be redistributed and reinstalled on end user equipment. This procedure generally requires the licensees or owners of copies of application programs to dispose of the non-network original versions either by destruction of the copies or return of the copies to the publisher.

The industry also faces the problem of how to insure recovery of its cost plus a profit from the application programs which it develops. The single copy license or price of an application program is thought to have been relatively effective so that the price of a program can be a direct function of a reasonable estimate of the number of users. However, the introduction of local area networks which would allow multiple users to use the same application program creates a distinct problem with respect to pricing. The number of such users may be relatively unlimited. Indeed, new technology of higher speed microprocessors and memory, which has driven the development of programming functions executing in an interdependent fashion in multiple processors, is making it feasible for more and more users to share the same program and data files. The practical limit of the number of users who may access a single program and associated data files is generally dependent on the speed of the access. There comes a point when the number of concurrent users becomes such that an individual cannot access the program or the data files in a reasonable period of time. However, as technology improves the processors and storage devices, speed of access and computing time is improved, and the number of concurrent users may increase.

The subject invention was conceived as a result of having a large number of computer software application programs which were designed to execute in a single user environment and needed to migrate to a multi-user/multi-tasking operating environment. The original application programs made no provisions for file sharing or record locking as was later required by changing times and computer interconnected environments. In the past, the migration of such single user environment application programs was achieved only at the investment of great time and money to rewrite the application programs for the multi-user/multi-tasking environment. Moreover, this approach was not practical in this case because existing application programs could not be changed as the base product had already been sold to and installed by existing end users who wanted to grow into a network environment at a minimal cost. If the traditional approach had been taken, over 400 programs would have required source program modifications to accomodate the new environment. The language compiler to which the original programs were written did not support file sharing or record locking, so any attempt to modify the application programs to support these features would require compiler changes or adhoc assembler calls to accomplish the file support required. A further complication to the task was the fact that, due to the large number of application programs, no one person nor computer system understood how each program was using the data files accessed by the programs. Some of the application programs required temporary work files. When the same program was running on two different systems using a temporary file with a specific name, the result would be far from acceptable. In addition, the application programs were structured in programs and groups of programs whose process interlocking needed to be controlled.

The network used for implementation was the IBM Local Area Network (LAN) for the IBM Personal Computer. It supports two basic types of logical systems: server systems which share their devices with other computers on the network, and remote systems which use devices attached to the server systems. The server systems generally provided access to their disk files and printers to remote systems. The caveat to this protocol was when files were concurrently required by other systems, the default was non-share; i.e., only one computer system and its application program at a time could open a non-share file. When multiple application programs across multiple systems required file access, a special parameter was required by the requesting program indicating shared file usage.

Among the problems posed by the migration from a single user environment to a network environment was that the network afforded users the ability to illegally copy application programs and their appropriate control files to remote systems. Because it normally took too long to load programs across the network, users would make copies trying to increase the overall performance of their network. While the application programs would run faster, the programs would get out of control beacuse their control files would be duplicated across the network.

Furthermore, it is desirable that the transition for existing users from a non-network environment to a network environment be smooth and transparent; i.e., require minimal retraining and adjustment to the new environment. It is also desirable that, once a user has crossed the bridge to a network environment, they should still be able to run stand-alone application programs in a non-network environment or mode.

SUMMARY OF THE INVENTION

It is therefore a general object of my invention to allow sharing of programs and associated data files by multiple users in a network.

It is another and more specific object of the invention to provide a procedure for allowing a large base of existing application programs written for a non-network environment to be used in a multi-user/multi-tasking environment without having to rewrite the source code of the application programs.

It is another object of the present invention to provide a procedure which is adapted to an existing local area network that allows users of application programs that were designed to operate in a non-network environment to use those same programs in the network environment with minimal retraining.

It is a further object of my invention to achieve the foregoing objects at a resonable cost both for the program developer and for the program end users.

I have developed what is termed a "node enabler" program which allows programs to execute across multiple intelligent nodes (individual central processing units or computers) and allow sharing of these programs by multiple users in a network. My method comprises a program stored in each node or computer on the network which program converts a data management request into a file sharing and record-locking protocol which may be forwarded to one node or computer which is designated as the server computer. In addition, my method comprises another program stored in the server computer which includes means for deciding which of the requestor computers may have access to a specified application program in response to a request from that requester computer.

In determining how to provide file sharing facilities to programs which were oblivious to the concept, the following technique was used. Each program, in a base of over 400 programs, was scrutinized to determine whether its intent was to merely read an existing file, create a new file, or update an existing file. A symmetrical matrix based on program names was built which identified each program by name and whether or not the program could run concurrently with other programs in the network. The following is a sample of the matrix.

|      | A<br>A<br>0<br>0 | A<br>A<br>0<br>1 | A<br>A<br>0<br>2 | A<br>A<br>0<br>3 |
|------|---|---|---|---|
| AA00 | Y | N | Y | Y |
| AA01 | N | Y | Y | Y |
| AA02 | Y | Y | Y | Y |
| AA03 | Y | Y | Y | N |

The above table depicts four named application programs (AA00, AA01, AA02, and AA03). The letter "N" denotes that a program cannot be executed when a conflict will occur with another user or task in the network; e.g., program AA00 cannot execute in the network if program AA01 is already executing in the network. However, program AA00 can execute if another copy of itself or programs AA02 or AA03 are currenty running in the network.

In order to make the above control decisions, some level of control is required before a request is passed to the operating system to load a program. To accomplish this interception of a user or program request, a software layer was added on top of the Disk Operating System (DOS) of the IBM Personal Computer (PC). The software addition, referred to as a hypervisor, intercepts all program load/execute requests and file processing requests. The intent of the interception is two fold.

First, all requests for program load/execution are directed to the server system which maintains information about each user in the system; i.e., what programs are they currently running. The server system takes the name of the program being requested and checks the current user list and program matrix to insure that no conflicts exist within the network. If no conflicts are found, the user table is updated to reflect the remote system's intent to load the program. Conversely, when the remote system concludes the execution of a program, the user table in the server system is updated to reflect this new piece of control information. If a conflict during program loading is received by the remote system, a message is placed on the user's display screen inviting them to retry the request until the conflict is resolved or to cancel the current program load request.

Second, all file open requests are intercepted by the hypervisor and converted to reflect file sharing attributes which are not specified as a result of earlier programming techniques employed. Further, the names of temporary work files might be changed to enhance the concurrency aspect of the applications in a network/multi-tasking environment. Under certain conditions when an application is reading or writing selected application control file records, these requests are also intercepted by the hypervisor and the record is changed as the multiuser environment dictates.

Further in the practice of the invention, as a matter of program control certain application programs are not allowed to execute on remote computer systems but only on the server/resource manager computer system.

As an additional level of program usage control, the issue of insuring that only properly licensed users could successfully operate on the network needed to be considered. The user can purchase the base applications (any where from 70 to 400 programs) and can then install the programs on the server system as in any single user computer system application. In order for additional users to operate within the network environment, each additional user is required to purchase an application network authorization diskette. Each diskette is encoded at the factory with a unique serial number. The mechanics of adding users is as follows. Each remote user is required to make a copy of their network authorization diskette. The original of the network authorization diskette is used by the person operating on the server system, and the copy is used by the first remote computer system. Before any remote users could start using application programs, the server system is required to start its network hypervisor. Only then can any of the remote systems successfully start their hypervisors. As the remote systems start, their unique network diskette serial number is sent to and recorded by the server system for verification of authenticity and a check that the serial number sent is not already in use. The server software also provides for recognition of remote computer systems disconnecting or removing themselves gracefully from the network and appropriately logs these systems off of the application network.

One advantage of my method is that the program code which distributes or "enables" the execution of function remotely from the server is an individual program which is loaded into each remote computer. The same is true for the program code which is entered into the server computer. The "node enabler" product, as the two programs may be viewed, are companions to the application programs whose function and data files are to be shared on the network.

BRIEF DESCRIPTION OF THE DRAWINGS

The foregoing and other objects, aspects and advantages of the invention will be better understood from the following detailed description of a preferred embodiment with reference to the drawings, in which.

In the logic flow diagrams, all logic is presented in horizontal representation versus traditional vertical representation. Entry to each page of logic flow is from the far left center of the page with the exit being on the far right of the page. Each decision symbol (or diamond shape) is entered at the 9:00 o'clock position and with a true result exit at 12:00 o'clock and a false result at 6:00 o'clock. Each decision symbol is marked with the letter "D" followed by a number which corresponds to a more in depth description of the decision being performed. This is located at the 10:30 o'clock position. Logic processes or computations (rectangular shapes) are entered from the left and exit on their right. Traditional subroutines are denoted by an additional horizontal bar within the rectangle, the name of the subroutine being called being in the smallest portion of the rectangle. The function of the subroutine is described in the larger portion of the rectangle. Circles are used as connectors and serve only to describe how two logic points converge to a single point. Logic flow enters a circle at the 12:00 o'clock and 6:00 o'clock positions with the flow output continuing at the 3:00 o'clock position.

DETAILED DESCRIPTION OF THE PREFERRED EMBODIMENT OF THE INVENTION

Figure 1:
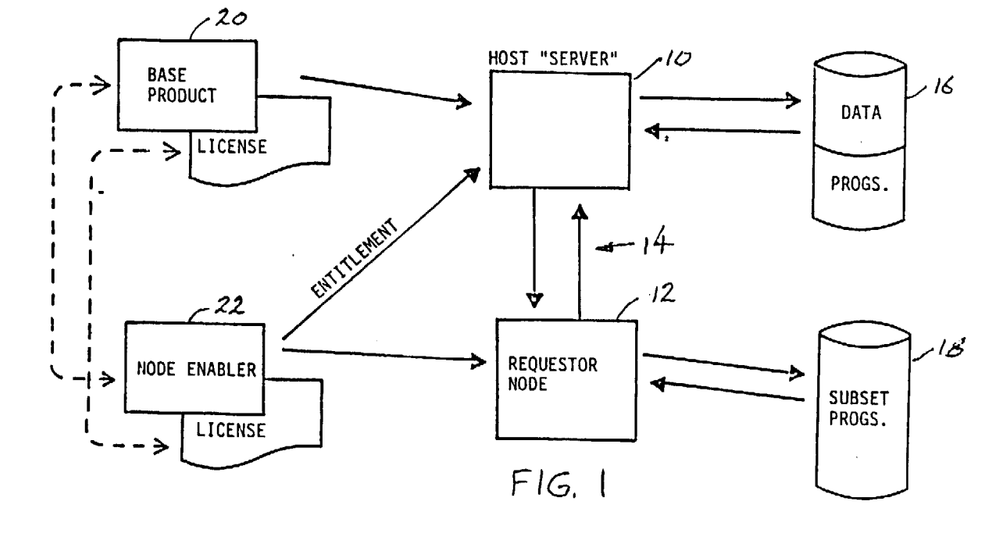
FIG. 1 is a simplified block diagram showing a local area network composed of a server computer and one remote or requestor node with the "node enabler" product installed.

The following is a brief overview of the procedure according to the invention will be provided with reference to FIG. 1 of the drawings. As illustrated in FIG. 1, a local area network is comprised of at least two computers 10 and 12 connected via a communications network 14. One of these computers 10 is designated as the server, and it includes storage devices 16 for storing data files and application programs which are to be available for acces on the network. The other computer 12 is designated as a remote or requestor node and it too may include storage devices 18 for storing a subset of programs, although these programs would not be shared on the network. Further, as indicated in FIG. 1, the base product or licensed application program 20 is installed on the server computer. The "node enabler" program 22 with a license under the base product 20 is installed on the requestor node 12 and entitles the requestor node to run the application program.

The process of starting computer systems on a network consists of starting the operating system, otherwise known as Initial Program Load (IPL), starting the PC Network (i.e., the LAN software), and starting the network/operating system extension or hypervisor. The hypervisor software is what has been referred to as the "node enabler" and functions slightly differently depending on whether it is running either the server system or the remote system.

On the server system, there are two parts to the hypervisor. The first part acts as an extension to the PC Network, via its post routine which inspects and responds to file/program requests and special data control blocks that are passed from a remote to the server system. The second part of the server hypervisor intercepts the appropriate operating system calls from the application programs and converts them to a form acceptable to file sharing and record locking techniques of the operating system. Any special data control block information required by the post routine are generated and passed directly to the post processor without having to go through the network. This is because the server system could also have a user running an application on the computer system.

On the remote system, the hypervisor intercepts appropriate operating system calls from the application programs and converts them to a form acceptable to file sharing and record locking techniques of the operating system. The operating system then directs any file and program requests to the server system that could not be satisfied locally. Any special data control block information required by the post routine is generated and passed to the server system by the PC network program.

The hypervisor is distributed on a diskette for personal computers such as the IBM PC. Each diskette has a unique serial number encoded in a file named SERIAL. For each remote system that a user runs which requires the hypervisor, the serial number is copied from the diskette to the server system. The server system maintains a file of all unique serial numbers which are authorized to use the system. Starting the hypervisor on the server system is required before any remote systems can successfully utilize the application programs. The starting process loads the hypervisor into memory along with a list of all serial numbers which can be logged on from remote computers. The hypervisor ties into the PC-DOS operating system via interrupt 21 hexadecimal, and to the PC network user post routine. Stopping the hypervisor on the server system can only be accomplished when there are no remote systems currently using the version of the hypervisor on their computer systems. In the event remote systems are still logged onto the server system hypervisor, then a message is presented to the server system operator or user indicating that a remote hypervisor is in use. Further, the hypervisor will only supervise applications containing the logic to enable its usage. Therefore, normal end user application programs would not be affected by the hypervisor in the normal course of events.

The user post routine is a subroutine which is passed control each time a network service event is requested from the server system. The subroutine is passed a control block which represents the type of service being requested from a remote system. This control block typically contains control information (what to do) and data (the name of the file to open).

Figure 2:
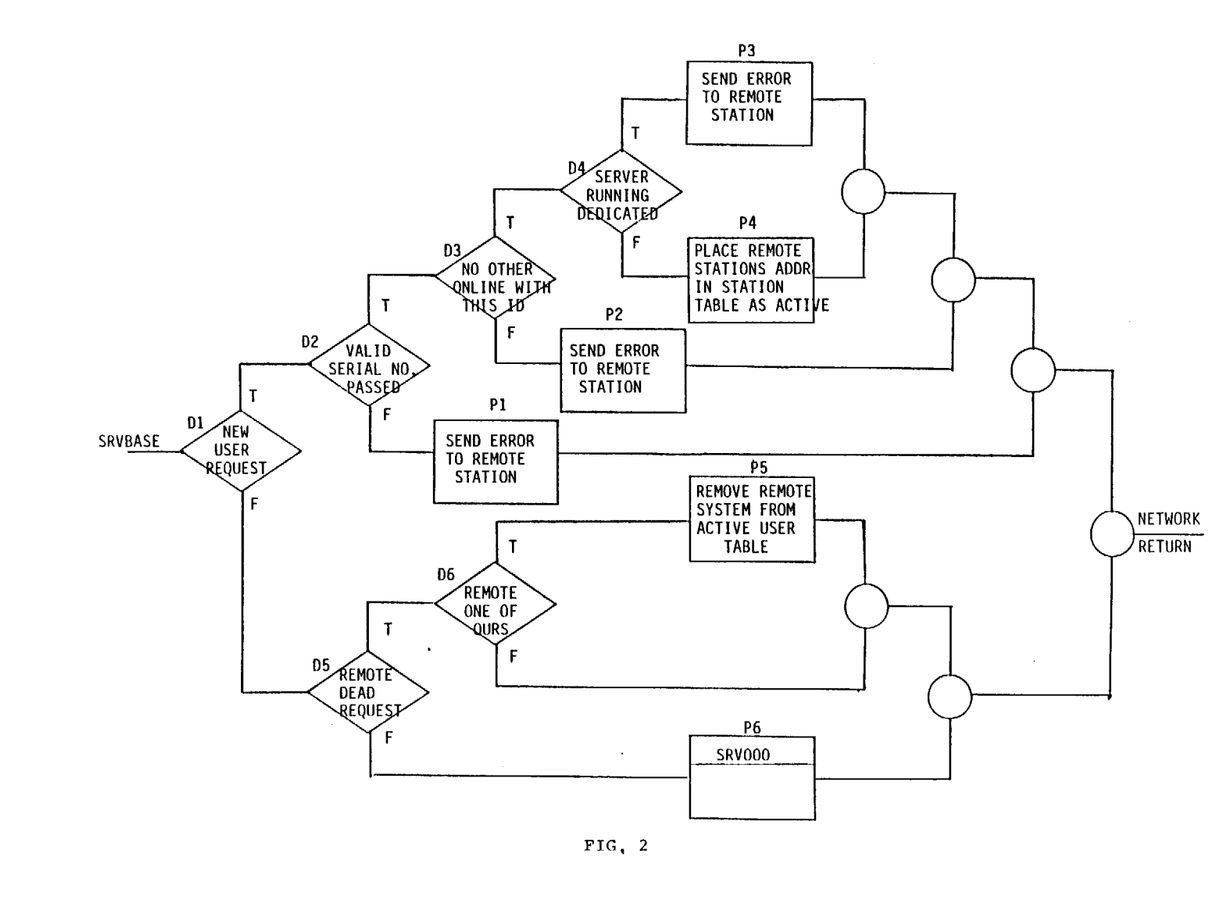
FIG. 2 is a flow diagram of the logic of the overall hypervisor program according to the invention.

With reference now to FIG. 2 of the drawings, the first decision block D1 is entered by a call to the server base and checks the control block for a request to establish the remote computer as a new user on the network. Within the control block is a user serial number which should conform to a set pattern (such as a check sum). The decision in decision block D2 insures that the serial number received is encoded properly. If the outcome of decison block D2 is false, then the control block is reformatted in function block P1 indicating that the serial number passed to the server system contained invalid information. The control block contents are returned to the remote system which initiated the request. On the other hand, if the outcome of decision block D2 is true, then in decision block D3, the serial number is compared with all of the other remote computers which are currently logged onto the system. The intent here is to insure that a remote computer user is not logged onto the central system with multiple sessions. If the outcome of decision block D3 is false, the control block is reformatted in function block P2 indicating that another remote system is currently logged on with this serial number. Again, the control block contents are returned to the remote system which initiated the request. On the other hand, if the outcome of decision block D3 is true, then decision block D4 insures that the host or server system is not currently running a program which requires the use of dedicated host resources. If the outcome of decision block D4 is true, the control block is reformatted in function block P3 indicating that the server system is currently running in a dedicated mode and will not accept any remote stations to log on at this time. Once again, the contents of the control block are returned to the remote system which initiated the request. On the other hand, if the outcome of decision block D4 is false, the control block is reformatted in function block P4 to indicate the remote system has successfully logged onto the server system resource manager. The control block associated with the remote system is cleared to a new user state (a fresh start for the remote system). The appropriate "ON-LINE" indicator is set in the control block associated with the remote system. The control block contents are returned to the remote system which initiated the request.

Returning now to decision block D1, if the outcome had been false, i.e., in the event a remote computer is powered off or restarted via an IPL, the network control program will supply a control block with the appropriate remote system's address. The decision in decision block D5 checks for the network program's notification of a remote computer which has logically ceased to exist. If the outcome of this decision is false, a subroutine SVR000 is called in function block P6. This subroutine is described in more detail in FIG. 3. If on the other hand the outcome of the decision in decision block D5 is true, a check is made in decision block D6 to determine if the remote computer was logged on to this resource manager. If the outcome of the check in decision block D6 is true, the remote system is removed from an "ON-LINE" state in function block P5; otherwise, control passes directly to the network.

Figure 3:
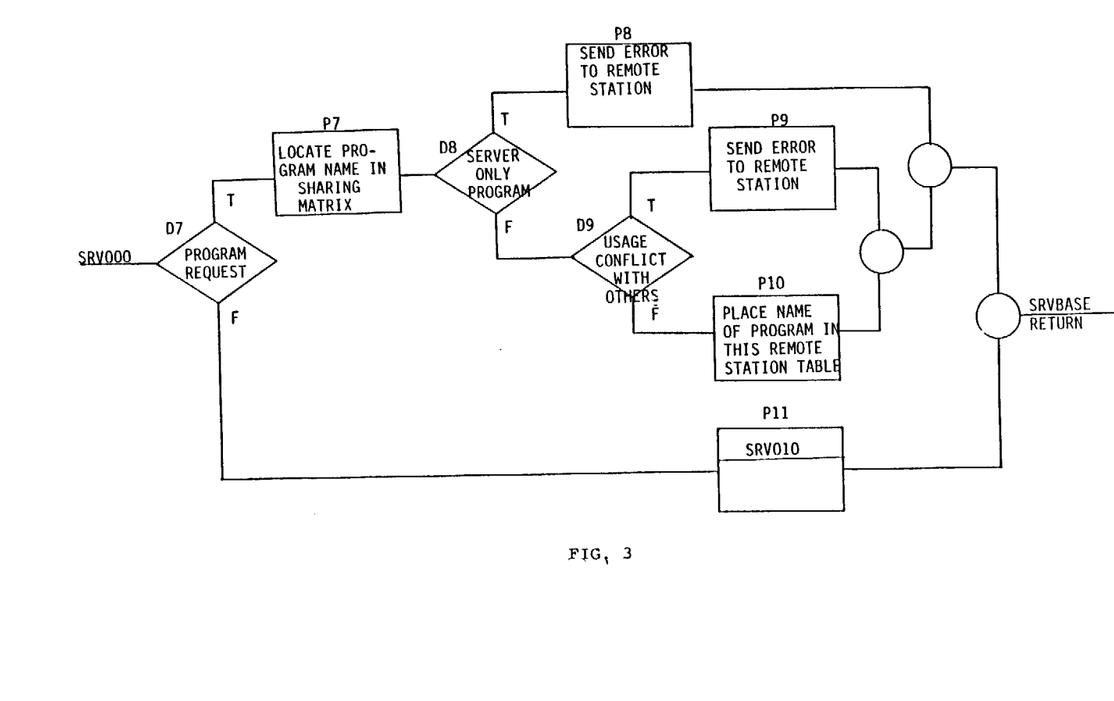
FIG. 3 is a flow diagram of a subroutine called by process P6 in FIG. 2 to handle a program request from a remote computer.

FIG. 3 is the logic flow for the subroutine SRV000 called in logic process P6 shown in FIG. 2. In FIG. 3, when a remote computer is requesting a program or group of programs, the remote computer will provide the name of the program or group of programs to the server system. The decision in decision block D7 determines if a program or group of programs start request is being made. If the outcome of the decision in decision block D7 is true, a table look-up based on the program or group of programs name supplied is performed in function block P7. The results of the table look-up indicate whether the program or group of programs can be run concurrently while other systems including the server system are executing. In addition, an indicator specifying that this program or group of programs can only be run on the server system is also generated from this table look-up. Then in decision block D8, a check is made to insure the program or group of programs being requested is not a server only program or group of programs and currently will not interfere with any programs the server system may currently be executing. If the outcome of the decision in decision block D8 is true, then the control block is reformatted in function block P8 to indicate the remote system cannot execute the program or group of programs as requested, as it was not initiated from the server system user. Again, the control block contents are returned to the remote system which initiated the request. On the other hand, if the outcome of the decision in decision block D8 is false, the decision in decision block D9 tests whether this program will interfere with any other program currently in use by either the server system or any remote systems attached to the server system. If the decision in decision block D9 is true, the control block is reformatted in function block P9 to indicate that another computer system currently is running a program or group of programs that will interfere with this program or group of programs. The name of the computer which is currently holding up this request is also placed into the control block, and the control block contents are returned to the remote system which initiated the request. On the other hand, if the outcome of the decision in decision block D9 is false, the name of the program or group of programs being requested is placed into the remote computer's table entry located in the server system resource manager in function block P10. This is used the next time any computer request passes through the program or group of programs request logic of the server resource manager.

Figure 4:
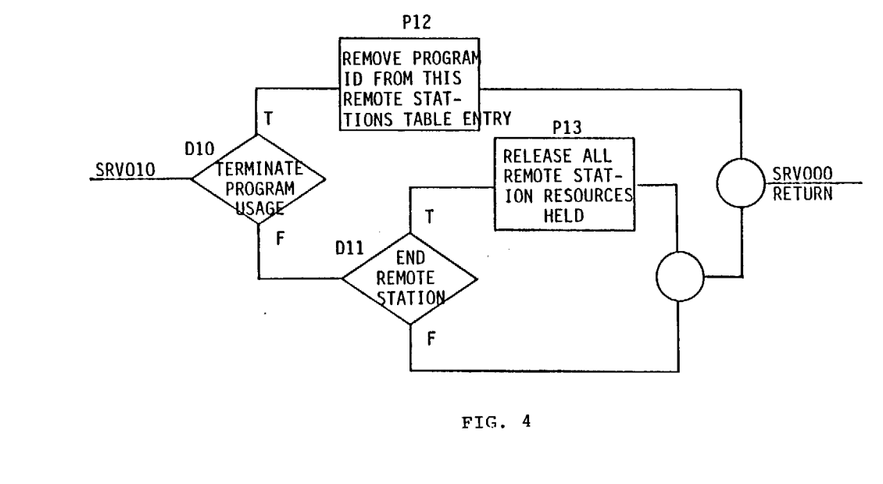
FIG. 4 is a flow diagram of a subroutine called by process P11 in FIG. 3 to terminate program usage.

FIG. 4 is the logic flow for the subroutine called in the logic function P11 shown in FIG. 3. In FIG. 4, the decision in decision block D10 checks the control block for a request to terminate the usage of a program or group of programs. If the outcome of decision block D10 is true, then in function block P12, the name of the program or group of programs currently identified in the remote station's control block is removed. The effect is to free a non-share resource of a program or group of programs. On the other hand, if the decision in decision block D10 is false, then in decision block D11, a check of the control block is made for a remote system signing off (log off) from the server system resources manager. A true outcome of the decision in decision block D11 releases all resources managed and held for the requesting computer in function block P13.

As stated earlier, application programs request file services from the operating system. To accomplish this task, they execute a software interrupt 21 hexidecimal with a sub-function code. The sub-function code requests such things as opening a file, closing a file and many other functions. Located on both the server and remote systems is logic (the DOS logic interception) which gains control prior to the operating system and performs customized activities to support file sharing and network activities.

Figure 5:
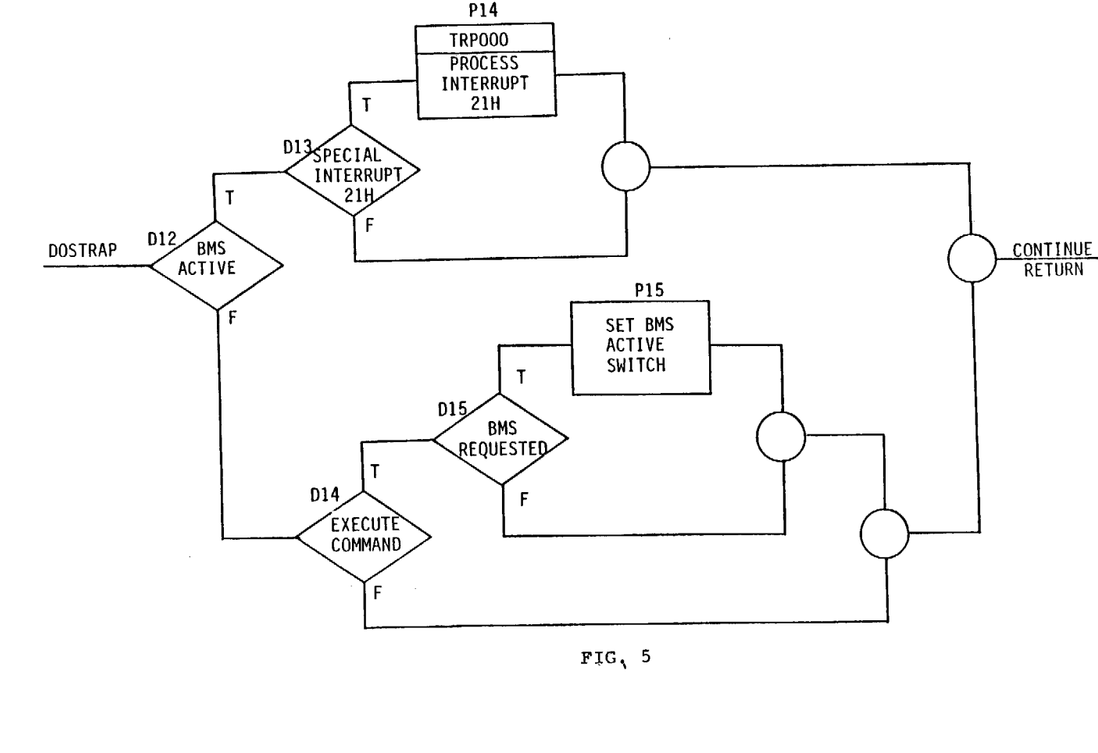
FIG. 5 is a flow diagram of the logic of the activation of a disk operating system (DOS) interception.

With reference now to FIG. 5 of the drawings, the entry point of the logic flow diagram is lableled "DOS-TRAP" to indicate DOS logic interception. In decision block D12, a check is made of an internal switch to see if the application program has been started by the operator and is currently in execution. This internal switch controls whether the DOS logic interception will be activated. This check precludes the changing of any system interrupt calls for application programs which do not need modifications. If the outcome of the check made in decision block D12 is true, a check is made in decision block D13 of the interrupt 21 hexidecimal sub-function to isolate calls which require special processing. Sub-functions which do not require special processing are passed directly to the operating system via the false path with the operating system returning control directly to the application after the service requested has been performed.

Returning to decision block D12, if the outcome of this decision is false, then a check is made in decision block D14 of the interrupt 21 sub-function to determine if a request to load and execute a program is being requested. If so, a check is made in decision block D15 of the name of the program to be loaded and executed to insure that it is the application program which requires special operating system considerations. If it is, function block P15 activates an internal local memory switch indicating that the application program is being loaded into memory for execution. All further DOS system interrupts (21 hexidecimal) should be interrogated for special processing.

Figure 6:
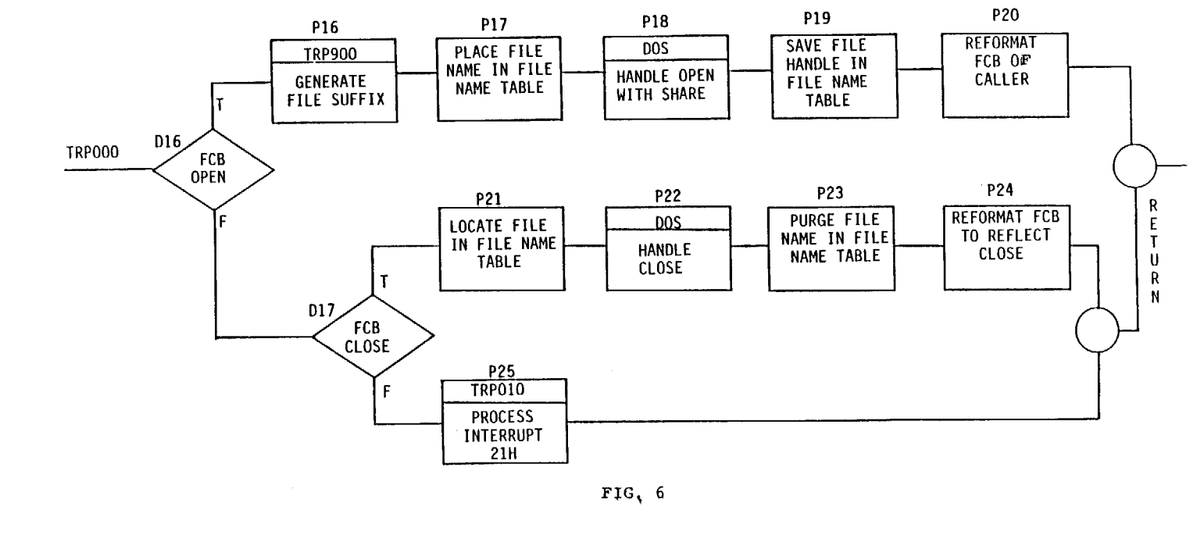
FIG. 6 is a flow diagram of a subroutine called by process P14 in FIG. 5 for a file control block open or close process.

FIG. 6 shows the logic flow for the subroutine called in the function block P14 shown in FIG. 5. In FIG. 6, a check is made in decision block D16 of interrupt 21 hexidecimal sub-function for a file control block open file request. If the outcome of the check in decision block D16 is true, then a request is made for a subroutine to generate a unique file name in function block P16, if such a unique file name is required. Then, in function block P17, the name of the file to be opened is placed into an internal file name table. The table is used as a cross reference between file names and file handles once a file has been opened via the DOS handle file open service. In function block P18, DOS is requested via the interrupt 21 hexidecimal to open the user's file and return an internal file handle (system name equivalent). The file sharing parameter is turned on as part of the request. The handle received from DOS is saved in function block P19 in the internal file table for later file input/output request handling. Finally, in function block P20, the caller's file control block is reformatted so that it appears that a normal call has been accomplished.

Returning to decision block D16, if the outcome of the decision is false, then a check is made in decision block D17 of the interrupt 21 hexidecimal sub-function for a file control block close file request. If the outcome of this check is true, a search is made of the file name table in function block P21 to locate the corresponding file handle required by DOS file services. Then, in function block P22, DOS is requested to close the file via the file handle protocol. In function block P23, the applications file name from the internal file table is purged, and in function block P24, the callers file control block is reformatted to reflect that the caller's file has been closed.

Returning to decision block D17, if the outcome of the decision is false, a subroutine is requested in function block P25. This subroutine will further qualify the DOS interrupt 21 hexidecimal sub-function to determine if special action should be performed on behalf of the application program.

Figure 7:
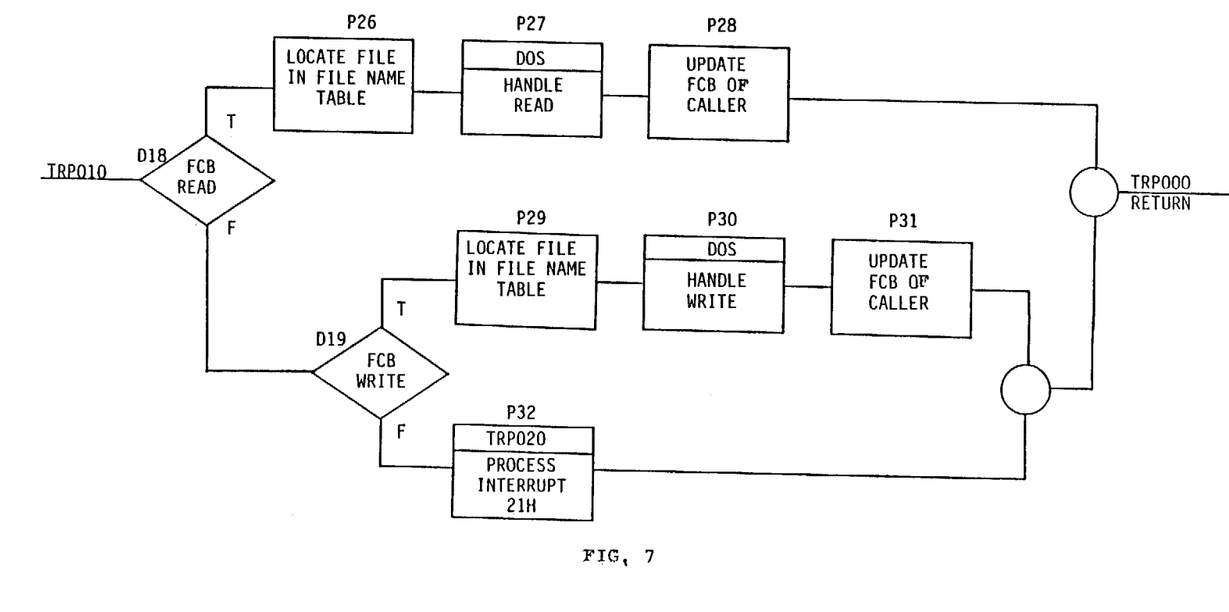
FIG. 7 is a flow diagram of a subroutine called by process P25 in FIG. 6 for a file control block read or write process.

FIG. 7 shows the logic flow of the subroutine called in function block P25 shown in FIG. 6. In FIG. 7, a check is made in decision block D18 of the interrupt 21 hexidecimal sub-function for a file control block read file request. If the outcome of the check is true, then in function block P26, the file name table is searched to locate the corresponding file handle required by DOS file services. This is followed in function block P27 by a request to DOS via the 21 hexidecimal interrupt to read a record from the application program's file via a file handle (system name equivalent). In function block P28, the caller's file control block is reformatted thus appearing that a normal file control block call has been accomplished.

Returning to decision block D18, if the outcome of the check in this decision block is false, a check is made in decision block D19 of the interrupt 21 hexidecimal sub-function for a file control block write file request. If the outcome of this check is true, then in funcion block P29, a search is made of the file name table to locate the corresponding file handle required by DOS file services. Then, in function block P30, DOS is requested via interrupt 21 hexidecimal to write a record from the application program to a file via a file handle (system name equivalent). Function block 31 reformats the caller's file control block thus appearing that a normal file control block call has been accomplished.

Returning to decision block D19, if the outcome of this check is false, then in function block P32, a subroutine is called which will further qualify the DOS interrupt 21 hexidecimal sub-function to determine if special action should be performed on behalf of the application program.

Figure 8:
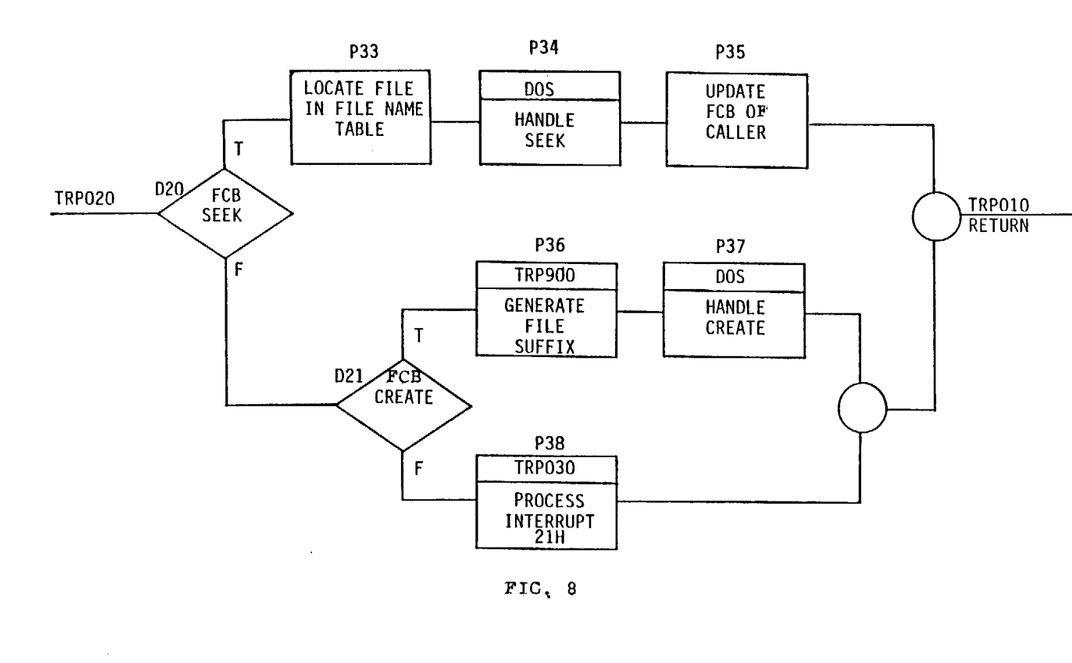
FIG. 8 is a flow diagram of a subroutine called by process P32 in FIG. 7 for a file control block seek or create process.

FIG. 8 shows the logic flow of the subroutine called in function block P32 shown in FIG. 7. In FIG. 8, a check is made in decision block D20 of the interrupt 21 hexidecimal sub-function for a file control block reposition of file location or seek operation. If the outcome of the check is true, then in function block P33, the file name table is searched to locate the corresponding file handle required by DOS file services. Function block P34 requests DOS, via interrupt 21 hexidecimal, to reposition the logical record position via the file handle (system name equivalent). Then, in function block P35, the caller's file control block is reformated so that it appears that a normal file control block call has been accomplished.

Returning to decision block D20, if the outcome of the check is false, a check is made in decision block D21 of the interrupt 21 hexidecimal sub-function for a file control block to create a new file. If the outcome of the check is true, function block P36 calls a subroutine which will further qualify the DOS interrupt 21 hexidecimal sub-function to determine if special action should be performed on behalf of the application program.

Returning to decision block D21, if the outcome of the check is false, function block P38 calls a subroutine which will further qualify the DOS interrupt 21 hexidecimal sub-function to determine if special action should be performed on behalf of the application program.

Figure 9:
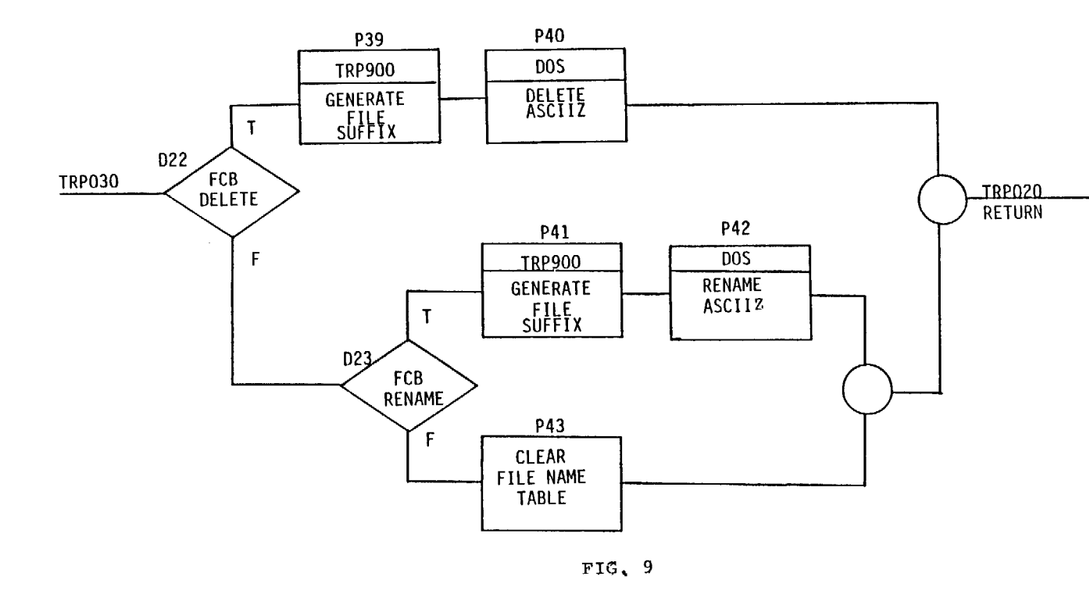
FIG. 9 is a flow diagram of a subroutine called by process P38 in FIG. 8 for a file control block delete or rename process.

FIG. 9 shows the logic flow of the subroutine called by function block P38 in FIG. 8. In FIG. 9, decision block D22 checks the interrupt 21 hexidecimal sub-function for a file control block to delete an existing file. If the outcome of the check performed in decision block D22 is true, function block P39 calls a subroutine to generate a unique file name if one is required. DOS is then requested, via interrupt 21 hexidecimal, to delete an existing file via an ASCIIZ string in function block P40. An ASCIIZ string is a character string encoded in ASCII (American Standard Code for Information Interchange) wherein each ASCII character code is delimited by a binary zero (Z).

If the check in decision block D22 is false, decision block D23 checks the interrupt 21 hexidecimal sub-function for a file control block to rename an existing file to a new name. If this check is true, a subroutine is called in function block P41 to generate a unique file name if one is required, and then a request is made to DOS, via interrupt 21 hexidecimal, in function block P42 to rename an existing file to a new name via an ASCIIZ string. On the other hand, if the outcome of the check in decision block D23 is false, the termination process is preformed in function block P43. The internal file name table is purged and all files are closed by the operating system during the termination process.

Figure 10:
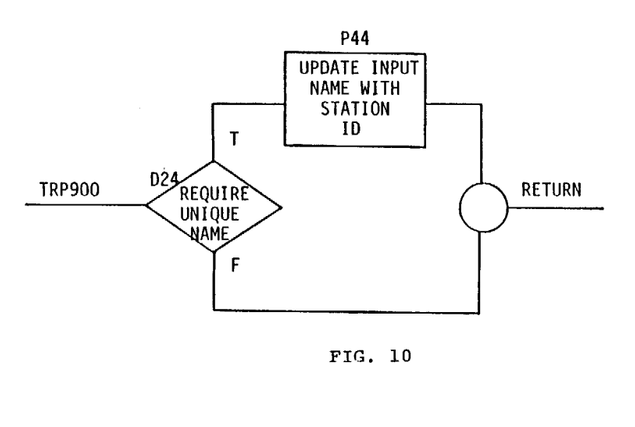
FIG. 10 is a flow diagram of a subroutine called by process P16 in FIG. 6, process P36 in FIG. 8 and processes P39 and P41 in FIG. 9 for generating a file suffix.

FIG. 10 shows the logic flow for the subroutine called in function blocks P39 and P41 in FIG. 9. In FIG. 10, decision block D24 performs a table look-up of the file name passed to the interrupt routine to determine if the file requires a unique name be used instead of the name the application program desires. If so, function block P44 adds the user station number (two digits) to the file name passed to this subroutine.

The concepts of program authorization and/or control according to the invention have broad applications in the field of computer science. Such areas of specialization as artificial intelligence, parallel processing and process control could benefit from the invention. Therefore, while the invention has been described in terms of a single preferred embodiment and in a specific preferred evironment as the best mode of implementing the invention, those skilled in the art will recognize that the invention can be practiced with modification within the spirit and scope of the appended claims.

Having thus described my invention, what I claim as new and desired to secure by Letters Patent is as follows:

1. A method for allowing one or more remote computers to execute one or more application programs and to share data files under the control of a server computer connected in a network with said one or more remote computers without modification of existing application programs which were designed to operate in a non-network environment comprising:
    establishing at said server computer a program matrix with entries indicating whether a program can be run while another program or group of programs are being run on the network;
    maintaining at said server computer a list of the programs currently being run on the network and data files currently being accessed or otherwise not availblbe for access;
    transmitting to said server computer from each remote computer a unique identification;
    recording the unique identifications of the remote computers at the server computer to provide an indication that the remote computers are authorized to use application programs and access data files;
    converting a data management request originating at said server computer or one of said remote computers into a file sharing and record locking protocol request message;
    transmitting said file sharing and record locking protocol request message originating at one of said remote computers to said server computer;
    checking said program matrix and said list to determine if said request message poses a conflict with a currently running program; and
    checking the recorded unique identifications of the remote computers to determine if the remote computer which transmitted said request message is authorized to run an application program or access a data file.

2. The method recited in claim 1 further comprising:
    granting said request message if the request message does not pose a conflict with a currently running program or data file and if the remote computer which transmitted said request message is authorized to run a requested application program or access a requested data file; and
    updating said list; otherwise, denying the request message.

3. The method recited in claim 2 further comprising:
    transmitting an information message to a remote computer from which said request message originated indicating that a conflict exists when said request message is denied; and displaying to a user of the server computer or a remote computer from which the request message originated that a conflict exists and that the request message is denied.

4. A procedure which allows users of a computer system comprising a plurality of computers connected in a local area network to share both file resources and application programs on the local area network without modification of existing application programs which were designed to operate in a non-network environment wherein one of said computers is designated a server computers and the remaining ones of said plurality of computers are designated remote computers comprising:

establishing at said server computer a table of said application programs with entries in said table indicating whether any one of said programs or a group of said programs can be run concurrently while other programs are being run by computers on said network including said server computer;

maintaining at said server computer a list of programs currently in use by computers on said network and data files currently being accessed by computers on said network;

converting at one of said remote computers a request to load an application program or a request to access a data file into a file sharing and record locking protocol message;

transmitting said file sharing and record locking protocol message to said server computer on said local area network; and checking said table and list to determine whether the remote computer can load a requested program or access a requested data file.

5. The procedure according to claim 4 further comprising:

providing each remote computer on said local area network with a unique identification number;

transmitting said unique identification number from a remote computer to said server computer when said remote computer signs on to said local area network;

recording at said server computer the unique identification numbers of all remote computers which have signed onto said local area network;

maintaining a list of licensed users corresponding to said unique identification numbers; and checking the recorded unique identification numbers and said list of licensed users to determine for each request by a remote computer to load a program or access a data file whether that remote computer is authorized to load a requested program or access a requested data file.

6. The procedure according to claim 4 further comprising updating said list whenever a request to load a program or access a data file is granted or whenever a remote computer is no longer running a previously loaded program or accessing a data file.

* * * * *